United States Patent

[11] 3,610,520

| | | |
|---|---|---|
| [72] | Inventor | Raymond S. Connell<br>Edgewater, Md. |
| [21] | Appl. No. | 65,411 |
| [22] | Filed | Aug. 20, 1970 |
| [45] | Patented | Oct. 5, 1971 |
| [73] | Assignee | Aeronautical Radio Inc.<br>Annapolis, Md. |

[54] COMMUNICATIONS CALCULATOR
2 Claims, 1 Drawing Fig.

[52] U.S. Cl. .................................................. 235/78,
235/88
[51] Int. Cl. .................................................. G06c 27/00,
G06c 3/00
[50] Field of Search .................................. 235/78, 84, 88

[56] References Cited
UNITED STATES PATENTS
2,809,787  10/1957  Bartow .......................... 235/84
3,050,249  8/1962  Awramik, Jr. .................. 235/78

Primary Examiner—Richard B. Wilkinson
Assistant Examiner—Stanley A. Wal
Attorney—Stevens, Davis, Miller & Mosher ABSTRACT: A circular slide rule for quickly and accurately performing a wide range of radio system calculations involving free space attenuation, tropospheric scatter propagation, thermal noise, modulation, system noise temperature, flux density, etc. in which each known parameter is sequentially entered to effect a cumulative result. Calculations other than by the invention are obviated, and the calculations possible start with transmitting power and yield signal-to-noise output of a distant receiver, for any type modulation index or bandwidth. Since the result is always a cumulative one, calculations can begin or end at any intermediate point between transmitter power and receiver output.

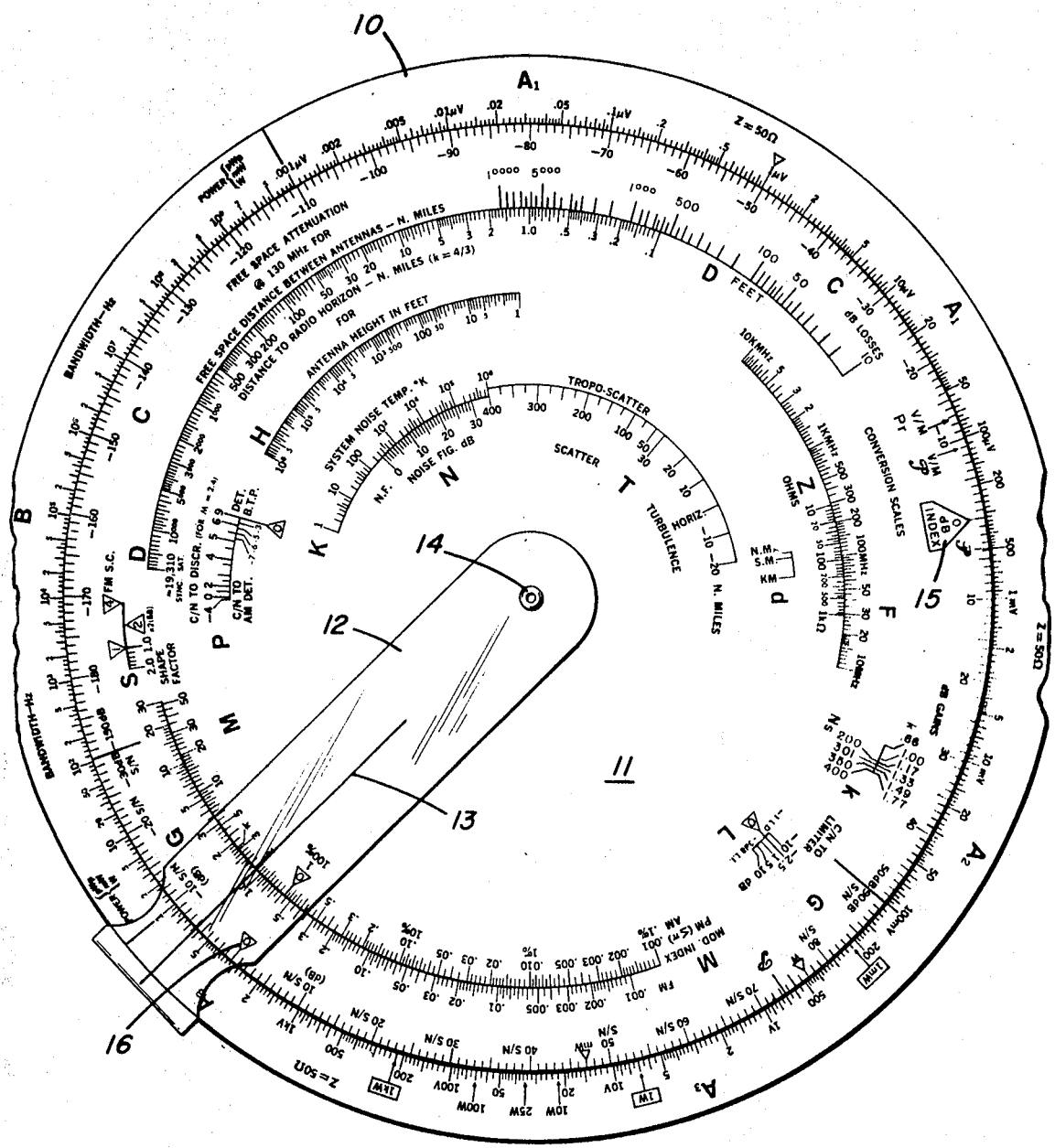
INVENTOR
RAYMOND S. CONNELL
BY
Stevens, Davis, Miller & Mosher
ATTORNEYS

COMMUNICATIONS CALCULATOR

The present invention relates to a circular slide rule for quickly and accurately performing a wide range of radio systems calculations involving free space attenuation, tropospheric scatter propagation, thermal noise, modulation, system noise temperature, flux density, etc. The design and location of the scales on this circular slide rule are such that as each known parameter is entered sequentially, its effect is registered as a cumulative result. No operations other than manipulation of the inventive circular slide rule are needed to work a complete calculation, beginning with transmitter power and yielding signal-to-noise ratio at the output of a distant receiver, for any type of modulation and any modulation index, as well as for any bandwidth. Since a cumulative result is always available, or can be entered as a known parameter, a calculation can begin or end at any intermediate point between transmitter power and receiver output. Some examples of calculations which begin and/or end at some intermediate point in system calculations are:

1. Finding the flux density per square meter at a given distance when transmitter power and antenna gain are known;
2. Finding signal level at the receiver input when the flux density and antenna gain are known; and
3. Finding signal-to-noise ratio at the receiver output when receiver characteristics and signal level are known.

The scope of problems which can be solved include point-to-point multichannel microwave and air-to-ground transhorizon situations involving tropospheric scatter. All types and degrees of modulation can be handled, and antenna heights and distances may be in feet, metric units, statute miles, or nautical miles.

The versatility of this circular slide rule is obtained by placing certain scales, representing the variables and constants of this type of problem, according to their mathematical relationship, while other scales are positioned so that entering each parameter of the problem results in an unbroken sequence of motions which adds or subtracts the effects of each parameter in turn. Supplemental scales are used for entering the effects of limiters, signals below threshold, and filter shape factors. The supplementary scales, having no fixed relation to the other scales, are placed where they best fit into the smooth sequence of operations.

Basically, the calculator assumes certain conditions such as unity modulation index, free space propagation, signal-to-noise ratios above the detector thresholds, isotropic antennas, 50 ohm transmission line and receiver input impedances, distance in nautical miles, antenna heights in feet, a frequency of 130 MHz, and standard atmosphere. If other conditions actually prevail, corrections are made by setting the cursor to the actual condition, then "zeroing" the scale on which the parameter is represented. These basic assumptions, and the resultant design they permit, are an important feature. The uniform method of entering corrections for variations from assumed parameters is another important feature which facilitates learning to use the calculator and contributes to its compactness.

The inventive circular slide rule consists of two concentric disks and a transparent cursor with a radially extending hairline for an indicator. One disk, hereinafter referred to as the stator, is sufficiently larger in diameter than the other disk to allow a scale around its periphery to be visible. The smaller disk, hereinafter referred to as the rotor, is free to turn upon the stator and the cursor is also free to turn independently of both disks. This construction follows the generally known circular slide rule design with the only mechanical innovation being cutouts on the cursor for the thumb to permit holding the cursor and stator stationary without binding the rotor.

It is therefore an object of the present invention to provide a new and improved circular calculator which, through the cumulative effect of information inserted therein, will quickly and accurately perform a wide range of radio systems calculations.

It is a further object of the present invention to provide a new and improved circular calculator for performing a wide range of radio system calculations which can be readily and economically produced.

The means for accomplishing the foregoing objects and other advantages, which will be apparent to those skilled in the art, are set forth in the following specification and claims, and are illustrated in the accompanying drawing dealing with a basic embodiment of the present invention. Reference is made now to the drawing in which the single FIGURE is a plan view of the inventive calculator.

Referring now to the FIGURE, the present invention comprises a larger disk or stator 10, a smaller disk or rotor 11, and a cursor 12 with a hairline 13 extending radially the length thereof. Both disks and the cursor are rotatably interconnected by means 14 at the geometric center thereof. The stator and rotor both have a plurality of scales thereon all of which are described herebelow:

The body or stator 10 has two scales, both of which are log scales. Both are arranged to increase in the clockwise direction. The A or volts scale is one continuous scale subdivided into sections A1, A2, and A3 and has 13 log cycles. Each cycle is precisely 20° of arc in length. Scale A1 begins at the extreme counterclockwise end at 0.001 $\mu v.$ and ends at 1,000 $\mu v.$ or 1 mv. Scale A2 covers 1 mv. to 1 1v. Scale A3 covers 1v. to 10 kv.

The A1, A2, and A3 scales convert voltage ratios to decibels, and power levels to volts across an impedance as well as vice versa. They are mainly used in conjunction with the C scale. The relationship between the A and C scales is 20 $\log_{10}$ V1/V2. Common transmitter powers in watts are noted on the A3 scale at the corresponding voltage across a 50 ohm load. These are for convenience in setting up certain problems and are marked as follows: 1 watt at 7.08 volts; 10 watts at 22.3 volts; 25 watts at 35.5 volts; 100 watts at 70.8 volts; 1 kilowatt at 223 volts. The second scale on the stator is the B or bandwidth and power scale. This B scale has 10 log cycles each of which is precisely 10° of arc in length. It begins at 1 and ends at $10^{10}$. The 1 and $10^{10}$ graduations are the same as the $10^4$v. and 0.001 volt graduations on the A1 and A3 scales, respectively.

The B scale is used for power or bandwidth calculations. It is normally used in conjunction with the G scale for signal-to-noise problems involving bandwidth ratio. The relationship is expressed as $-10 \log \Delta f_2 / \Delta f_1$. It is used with the C scale to express power ratios in db. ($10 \log P_2/P_1$).

Turning now to the rotor, the linear outermost scale is divided into two parts. One part is labeled C and extends 190° counterclockwise and 50° clockwise from a zero index 15. The counterclockwise positions are marked —db. and the clockwise divisions are marked +db. Each division equals 1° of arc length.

The C scale is used for entering gains or losses in db. and in adding and subtracting power in db. It is also used to convert voltages on the A scale and to db.m., db.w. or any other desired base. In conjunction with the B scale, the C scale is used to convert power in watts to db.w. or db.m.

There are several special reference marks on the C scale. P, which is located near the C scale index, is used in flux density problems. A basic assumption used in the calculators is that isotropic antennas are used at the transmitter and receiver. Gain or loss is added as required by the given system of parameters. Another assumption is that frequency is 130 MHz, unless corrections are made. Therefore, the isotropic antenna assumed in the design is at a frequency of 130 MHz, and has an effective area of less than a square meter. The flux density will be 3.73 db.w./m.$^2$ greater than the power intercepted by the 130 MHz isotropic antenna. The difference of 3.73 db. can be added into flux density problems by using the mark at P or simply by adding 3.73 db.w./m.$^2$ to the result as shown on the slide rule.

Marks at —9 db. and at —12.73 db. are used in problems involving volts per meter and power density or volts per meter and received power respectively.

The second scale on the periphery of the rotor is the G scale and comprises that portion of the linear scale beginning −190° counterclockwise from the zero index 15 and ending at +50° clockwise from the zero index. The G scale has a zero index 16 220° counterclockwise from the index 15 on the C scale. The G scale is labeled −10, −20, and −30 db. S/N clockwise from its zero index 16 and 10 to 90 db. S/N counterclockwise from its zero index 16. The +90 db. marker is also the +50 db. marker on the C scale.

The G scale shows signal-to-noise ratios opposite bandwidth on the B scale after signal level and noise figures are entered. The signal-to-noise ratio is predetected if read opposite IF bandwidth and before modulation is entered into calculations. It is postdetection signal-to-noise when read after the modulation index has been entered and proper allowance has been made for crest factor of the modulating information. It is output signal-to-noise when read opposite the noise bandwidth of the output filter or amplifier after making proper allowance of crest factor of demodulation.

The special reference marks on scale G are small triangles located at 47 db. S/N and 77 db. S/N and are simply reference marks unrelated to the G scale. When the triangle at 47 db., marked m.w., is set opposite a power level in m.w. on the B scale, the C scale index 15 points to volts across 50 ohms on the $A_2$ or $A_3$ scales for that power. This operation also enters the power level set on the G scale into calculations of flux density or received power at a given distance. The triangle at 77 db., marked W, is used in the same way for power levels of 1 watt and greater. P at 73.27 on the G scale can be used instead of the mark at 77 db. for setting power when flux density is the required answer. This eliminates the need to add 73.27 db.

The free space distance or D scale has distance marked in feet from 10 to 10,000 and nautical miles from 0.1 to 19,310. The scale begins with 10′ opposite −24.5 db. on the C scale and 10,000 feet opposite −84.5 db. It is a three-cycle log scale which increases in the counterclockwise direction. The miles scale is a six-cycle log scale which increases in a counterclockwise direction beginning at 0.1 mile near −60 db. and extending to 19,310 miles near −165 db. Each cycle occupies 20° of arc length. The indication for 220 miles is aligned with −127.0 db. on the C scale.

The D scale is used in conjunction with the C scale to find free space loss for a given distance in nautical miles at 130 MHz. It is also to be used with the H scale to find distance to the radio horizon.

The modulation index or M scales are composed of two log scales set back-to-back. The log scales increase in a clockwise direction and each log cycle is 20° of arc length. The two log scales are offset 4.8° due to a factor of 3X in the FM improvement equation. The outer scale of this pair is labeled FM and runs from 0.001 to 30. The inner scale of the pair is labeled PM ($\leq \pi$) and runs from 0.001 to 50. The inner scale is also marked AM, 0.1 percent to 100 percent corresponding to M=0.001 and M=1, respectively, on the PM scale. A common index marker is placed at M=1 on the PM scale and at 100 percent modulation. A mark $\pi$ is placed at 3.1416 on the PM scale to define the limit of the phase modulation index.

The modulation index scales are aligned so that M=1 (PM) and 100 percent are aligned with zero on the G scale. The M=1.0 on the FM scale aligned with −4.8 db. (4.8° counterclockwise from zero on the G scale and also 215.2° counterclockwise from the zero index is on scale C). The M scales are arranged so that the proper correction is applied when the cursor is set to the modulation index and the rotor turns to align the mark under the hairline. For this reason they might appear to be reversed unless the basic operation of the calculator is considered.

The M scales provide corrections to the calculated signal-to-noise if the modulation is other than phase or amplitude modulation with M=1.

The third scale radially inward on the rotor and inside the distance scale is the H or height scale. It is a six-cycle log scale which increases in the counterclockwise direction occupying 10° of arc length per cycle. It extends from 1′ to $10^{6'}$ and is aligned with the 1-foot mark opposite −82.5 db. and the $10^6$ feet opposite −142.5 db. on the D scale.

The height scale is used with the D scale to find the distance to the horizon, or conversely, the height required for a ray to be tangent to the horizon at a given distance.

The relationship between the figures under the cursor in the H and D scales is $D=\sqrt{1.14kH}$ where $k$ is the ratio or apparent earth radius to true earth radius and is equal to 1.33. This is 4/3 earth radius commonly used as a standard.

The noise figure or N scale is linear and is 30° in length covering 0 to 30 db. The N scale is aligned with the zero opposite −127 db. on the C scale. The N scale is used for entering the noise figure (or noise factor) of a receiver or amplifier. Its position relative to the G and C scales is determined by the relation $N=10 \log KT_oB$ where $T_o=290°$ K. B is bandwidth in Hz. and K is Boltzman's Constant.

The system noise temperature or K scale is backed up to the N scale and has 300° opposite zero on the N scale (opposite −127 db. on the C scale). It is a six-cycle log scale increasing in the clockwise direction and each cycle occupies 10° of arc length.

The K scale relates system noise temperature to N and may be used in lieu of N when appropriate or to convert between noise temperature and noise power.

The tropo-scatter or T scale is based on empirical data. It consists of two linear sections with different slopes. The first portion from 20 miles before the horizon (horizon−20) to 30 miles beyond the horizon (horizon+30) has a slope of 0.8 db. per mile. The second part extending from horizon +30 to horizon +400 has a slope of approximately 0.14 db. per mile. Alignment marks are therefore as follows:

| db. SCALE | MILES SCALE |
|---|---|
| 0 | −20 |
| −8 | −10 |
| −16 | 0 |
| −24 | +10 |
| −32 | +20 |
| −40 | +30 |
| −43 | +50 |
| −46.5 | +75 |
| −50 | +100 |
| −53.5 | +125 |
| −57 | +150 |
| −60.5 | +175 |
| −64 | +200 |
| −67.5 | +225 |
| −71 | +250 |
| −74.5 | +275 |
| −78 | +300 |
| −81.5 | +325 |
| −85 | +350 |
| −88.5 | +375 |
| −92 | +400 |

The T scale adds troposphere scatter loss when the horizon is obstructed by a smooth earth. Its position relative to the C scale anticipates that one terminal will be an airplane in flight.

The $k$ or factor scale has $k=0.66$, $k=1.00$, $k=1.17$, $k=1.33$ (4/3 earth radius), $k=1.49$, and $k=1.77$. Beneath the $k$ factor scale is the surface refraction index ($N_s$ scale). The $N_s$ scale shows $N_s=200$, $N_s=301$ (corresponding to $k=1.33$ or 4/3 earth radius), $N_s=350$ and $N_s=400$. These scales are used to correct distance to the horizon calculations. The marks $n_s=301$ and $k=1.33$ are aligned opposite the 35 db. on the C scale. The $k$ scale corrects for values of $k$ other than 1.33, or for values of surface refraction index other than $N_s=301$.

The L scale does not have a critical area of placement. It has five marks spaced 1° of arc apart. The scale is marked (from left to right) −10, −2.5, 1, 5, and 10 db. on the upper side and −1 L.D., and +3 db. L.I. meaning −1 db. limiter degraduation, zero reference mark or "no correction," and +3 limiter improvement. The L scale adds the effects of a band-pass limiter when appropriate.

The S scale placement is also not critical, but for convenience it should be located approximately as shown. The scale is 3° of arc length and is divided logarithmically and labeled 2 to 1 and 1 to 1. The smaller divisions are 1.2:1, 1.4:1, 1.6:1 and 1.8:1. The ▽1▽ index is at 1:1, the △2△ index is 3°-clockwise and the ▽4▽ index is an additional 3° clockwise. The S scale allows the shape factor of a filter to be used in calculations.

The P or detector BTP scale has two parts: one for FM discriminator and one for an AM detector. The exact placement is not critical, but it must be in the general area shown for convenience in calculations. It should be aligned with a major division (e.g. −155 db. on the C scale) for ease in working. One scale is labeled C/N to discriminator and the other C/N to AM detector. The upper scale has +9 db. aligned with 0 db. on the lower scale. The lower scale divisions are 1° arc length apart and are labeled from right to left, 0, −3, −5, −6, and −7 db.

The upper scale divisions are as follows, assuming that the index is aligned with the −155 db. on the C scale:

C/N to discriminator scale
9—aligned with △△ on lower scale and with −155 db on C
8—aligned with −155.5 db
7—aligned with −155.75 db
6—aligned with 156.5 db
5.5—aligned with −158.0 db
5—aligned with −159.5 db
4.5—aligned with −161 db
4—aligned with −163 db
3.5—aligned with −164 db
3—aligned with −166 db
2.5—aligned with −167 db
2—aligned with −168 db
1—aligned with −169 db
0—aligned with −170 db
−4—aligned with −170.5 db The P scale extracts a penalty when the predetection signal-to-noise ratio is below the detector threshold. It is disregarded when the predetection signal-to-noise is above threshold which is roughly 9 db. for FM or PM when $M \cong 2.4$ and 0 db. for AM.

There are also several conversion scales provided which include the frequency conversion or F scale which is a three-cycle log scale covering 20° of arc length per cycle and increasing in a counterclockwise direction with 130 MHz aligned with the 0 db. index 15 on the C scale. The F scale extends from 10 MHz to 10,000 MHz. The F scale adds a correction to free space loss for frequencies other than 130 MHz.

The impedance or Z scale is a two-cycle log scale covering 10° of arc length per cycle. It has 50 ohms aligned with the 0 db. index 15 on the C scale and increases in a clockwise direction. It extends from 10 ohms to 1,000 ohms. The Z scale adds a correction for impedances other than 50 ohms.

The distance unit or d scale has only three marks. There are nautical miles (NM) opposite 0 db. on the C scale, statute miles (SM) opposite +1.2 db. on the C scale and kilometers (km.) opposite 5.2 db. on the C scale. No correction is required for calculations in nautical miles and hence the NM position is opposite zero. The d scale allows the use of statute miles or kilometer miles instead of nautical miles.

The calculator was designed for problem parameters to be entered in a definite routine manner. The following tabulation outlines the manner in which the main parameters are to be handled. Once the technique is understood, certain shortcuts in setting up problems will become apparent with practice.

1. CONVERTING POWER LEVELS TO VOLTS ACROSS 50 OHMS—
   a. Set the 0 db. index of scale C to (1°) on the A scale. Each number on the C scale is now referenced to 1 w. or 0 db.w. (e.g., read $100\mu$ v. across 50 ohms opposite −97 db.w.)
   b. db.m.. As above, but set the index to (1 m.w.).

2. FIND DISTANCE TO HORIZON FOR 4/3 EARTH RADIUS—Set the cursor to 20,000′ and read 174 NM under the hairline on the distance scale (scale D.).

3. FIND FREE SPACE PATH LOSS AT 130 MHz—Set the cursor to 174 NM on the distance scale "d" and read −125.5 db. (125.5 db. loss) on the C scale. To be sure of free space conditions, note antenna height on H under the cursor hairline. Unless one antenna is at least 20,000′, or the total distance to the horizon from the two antennas exceeds 174 NM, the loss reading will be too low.

4. "TROPO-SCATTER" LOSS—On the "Tropo-scatter" or T scale, set the cursor to the difference between total path length and the sum of the distances to the horizon from the two antennas. Read scatter loss under the cursor on the db. scale. For 275 miles the loss is approximately 74 db. Tropo loss must be added to free space loss. (Wide variations from these figures must be expected.)

5. SIGNAL STRENGTH AT 50 OHM RECEIVER INPUT—For 100 w. transmitter power, 10 db. antenna gain, 3 db. transmission line loss and free space distance 200 mi. air-to-ground ("Rotor index" means C index);
   a. Set the rotor index to (100 w.),
   b. Set the cursor to +10 db. (antenna gain) and turn the rotor to align the index with the hairline,
   c. Set the cursor to −3 db. (line loss) and turn the rotor to align the index with the hairline,
   d. Turn the cursor to 200 miles on the D scale and read $75\mu$ v. on the A scale under the hairline. Clamp the cursor and turn the C index to (1 w.), then read −99.5 db.w. as the power level at the receiver input.

6. FIND C/N AT INPUT TO AM DETECTOR—For input $1\mu v.$ (−137 db.w.), N.F.=3 db., and IF noise bandwidth 40 kHz.,
   a. Set the cursor to $1\mu v.$ and turn the rotor to align 3 db. on the N scale under the hairline.
   b. Turn the cursor to 40 kHz. on the B scale and read C/N=+18 db. on the G scale.

7. FIND AUDIO S/N OF RECEIVER USED IN ITEM 6—Assume 2.5 kHz. baseband bandwidth with 1.5 shape factor and 30 percent modulation. With S/N 18 db. and 40 kHz. aligned under the cursor, set the cursor to 30 percent modulation on the M scale and turn the rotor to align 100 percent under the cursor. Turn the cursor to 1.5 on the S scale (near −180 on the C scale). Turn the rotor to align △2△ under the hairline. Turn the cursor to 2.5 kHz. on the B scale and read +14.5 db. S/N at the audio output.

8. C/N AND S/N IN FM RECEIVER—Given $1\mu v.$ input across 50 ohms, N.F.=3 db., IF noise bandwidth 40 kHz., modulation index 2.4, baseband bandwidth 2.5 kHz., and Foster Seeley discriminator with limiter. Set the cursor to $1\mu v.$ and set the rotor to align 3 db. on the N scale under the hairline. Turn the cursor to 40 kHz. on the B scale and read 18 db. C/N in the IF stage. Set the cursor to +10 db. on the L scale and turn the rotor so △2△ on the L scale is under the hairline. Set the cursor to M = 2.4 on the FM part of the M scale. Turn the rotor to align △2△ on the M scale under the hairline. Turn the cursor to 2.5 kHz. on the B scale and read SIN = 46 db. on the G scale.

The present invention may be embodied in other specific forms without departing from the spirit or essential characteristics thereof. The present embodiment is to be considered in all respects as illustrative and not restrictive, the scope of the invention being indicated by the appended claims rather than the foregoing description, and all changes which come within the range of equivalency of the claims are therefore to be embraced therein.

I claim:

1. A communications calculator comprising a first disk of relatively large diameter; a second disk of smaller diameter than said first disk; a cursor having a hairline extending radially the length thereof; means rotatably and concentrically connecting said disks together with said cursor rotatable about the axis of rotation of said disks; a first continuous volts scale of 13 log cycles, each cycle having precisely 20° of arc length, extending counterclockwise along the periphery of said larger diameter disk; a second bandwidth and power scale of 10 log cycles, each cycle of which is precisely 10° of arc length, completing the periphery of the larger disk; a third two-part linear gains and losses scale along the periphery of said inner disk, a zero index, said scale extending 190° counterclockwise and 50° clockwise from said zero index, each division of said scale equaling 1° of arc length, said third scale being related to said first scale according to the formula $20 \log_{10} V_1/V_2$; a fourth linear signal-to-noise scale continuing around the periphery of said smaller disk from said third scale and having a zero index 220° counterclockwise from the index on said third scale; a fifth free space distance scale having a three-cycle log feet portion increasing in the counterclockwise direction and a six-cycle log miles portion increasing in the counterclockwise direction, each log cycle comprising 20° of arc length, a sixth modulation index scale comprising two back-to-back log cycle portions increasing in the clockwise direction, each log cycle extending for 20° of arc length; a seventh height scale located radially inward of the distance scale and having a six-cycle log scale increasing in the counterclockwise direction covering 10° of arc length per cycle and being related to the free space distance scale according to the formula $D=\sqrt{1.14\ kH}$ where $k$ equals 1.33; an eighth linear noise figure scale extending 30° in arc length; a ninth system temperature scale having a six-cycle log scale increasing in a clockwise direction, each cycle of which occupies 10° of arc length; a 10th tropo-scatter scale consisting of two linear sections of different slopes determined by empirical data; an 11th detector scale having two parts, one for FM discrimination and one for AM detection; a 12th factor scale for correcting for values of $k$ other than 1.33; a 13th scale for adding the effects of band-pass limiting; and a 14 th scale for filter shape factor.

2. A communications calculator according to claim 1, further comprising a frequency conversion 15th scale having three log cycles covering 20° arc length per cycle and increasing in a counterclockwise direction; an impedance 16th scale having two log cycles covering 10° arc length per cycle; and a distance 17th scale having indexes for converting between nautical miles, statute miles and kilometers.